United States Patent [19]

Hodel et al.

[11] Patent Number: 4,929,958
[45] Date of Patent: May 29, 1990

[54] HIGH PRECISION RADAR DETECTION SYSTEM AND METHOD

[75] Inventors: P. Lloyd Hodel, Redwood City; Paul V. Atkins, Pacifica, both of Calif.

[73] Assignee: Dalmo Victor, Inc., Belmont, Calif.

[21] Appl. No.: 386,417

[22] Filed: Jul. 26, 1989

[51] Int. Cl.⁵ .............................................. G01S 3/80
[52] U.S. Cl. .................................... 342/432; 342/437
[58] Field of Search ....................... 342/432, 437, 445; 367/124, 126

[56] References Cited

U.S. PATENT DOCUMENTS

4,198,705  4/1980  Massa .
4,207,572  6/1980  Hipp et al. .
4,313,117  1/1982  Lipsky .

Primary Examiner—Thomas H. Tarcza
Assistant Examiner—Mark Hellner
Attorney, Agent, or Firm—Flehr, Hohbach, Test, Albritton & Herbert

[57] ABSTRACT

A radar detection system with four transducers accurately determines the azimuth angle of a radar emitting object. The three strongest signals from the four transducers are combined to generate two differential signal values. A table is provided which contains angle of arrival values associated with all possible combinations of the two differential signal values. To determine the angle or arrival of a particular object, an index value is derived from the corresponding pair of differential signal values, and that index value is used to select the record in the table with the angle of arrival of the object, relative to the transducer which received the strongest signal. The table also stores a signal measurement correction for each combination of the two difference signal values. The signal measurement correction is to adjust the measured signal strength when calculating the distance of the object from the radar detection system.

8 Claims, 6 Drawing Sheets

HIGH PRECISION RADAR DETECTION SYSTEM AND METHOD

The present invention relates generally to radar detection systems and particularly to methods and systems used for accurately determining the direction of an object.

BACKGROUND OF THE INVENTION

Figure 1:
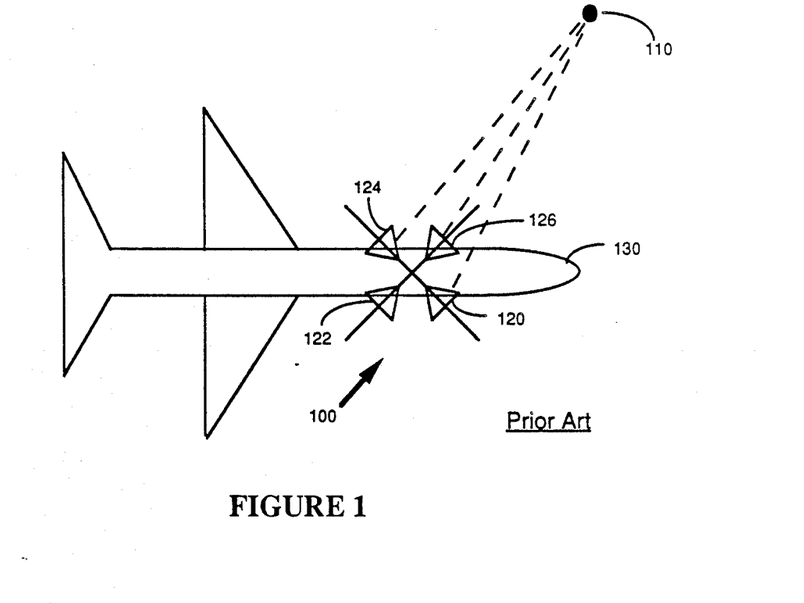
FIG. 1 schematically represents an airborne radar detection system for determining the direction of a radar emitting object.

Referring to FIG. 1, the present invention is an improved airborne radar detection system 100 which is intended to accurately determine the direction of a radar emitting object 110. The radar emitting object 110 is sometimes called an "emitter". Such systems typically have four transducers 120, 122, 124 and 126 mounted at reference angles of 45 degrees, 135 degrees, 225 degrees and 315 degrees, respectively, relative to the forward direction of a plane 130. Such system configurations can be used in a variety of radar warning systems, typically in systems which warn the pilot of the direction (i.e., radar signal angle of arrival) and distance of nearby radars.

The goal of the radar detection system 100 is to accurately determine the "angle of arrival" of a radar emitting object 110. The angle of arrival is typically defined to be the azimuth angle of a direct line to the radar 110. Such systems are also used to determine the approximate distance of the radar 110 from the plane 130. Prior art systems generally compute the angle of arrival by first determining which two transducers 120-126 are receiving the strongest signals from the radar 110, and then using the relative strengths of these two signals to determine the azimuth angle to the radar.

This prior art method of computing an azimuth angle is accurate when the radar emitting object is in the same plane as the four transducers 120-126, and is reasonably accurate when the angle of elevation to the radar, with respect to the plane occupied by the transducers, is fairly small. However, the inventors have found that the azimuth angles generated by prior art systems are quite inaccurate when the angle of elevation is more than thirty degrees or so.

One reason that such inaccuracies have been accepted in prior art systems is that it has been assumed that correcting the inaccuracy would require additional transducers, extra circuitry, exceed the allocated volume, and would slow down the response time of the system. In many such radar detection systems, fast determination of the azimuth angle of arrival is very important and speed cannot be sacrificed for better accuracy.

The present invention is based on the discovery by the inventors that using the measurements from three transducers, one can very accurately determine the azimuth angle to an object as well as the angle of elevation. In addition, the inventors have found a way of performing the necessary computations using very high speed hard-wired logic, thereby providing more accurate angle of arrival measurements without any sacrifice in the speed at which the measurements are performed.

It is therefore the primary object of the present invention to provide a radar detection system which accurately determines the angle of arrival of a radar, even when that angle includes a substantial elevation angle. Another object of the present invention is to provide a system which can determine the angle of arrival of a radar signal accurately and quickly. Yet another object of the present invention is to provide a system which can accurately determine the direction of an object using a standard set of four radar transducers.

SUMMARY OF THE INVENTION

In summary, the present invention is a radar detection system which accurately determines the angle of arrival of a radar signal. The system has four perpendicularly oriented transducers. When measuring the angle of arrival of a radar signal, the three strongest signals from the four transducers are combined to generate two differential signal values. A read only memory (ROM) is used to store the angle of arrival values associated with all possible values of these two differential signals. To determine the angle of arrival of a particular radar, the corresponding pair of differential values are used to access a corresponding angle value in the ROM, and then that value is summed with the reference angle associated with the transducer having the strongest signal.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

As discussed above with reference to FIG. 1, the antennas 120-126 on an aircraft 130 are generally set so that the boresight angles of the antennas 120-126 are oriented at reference angles of 45, 135, 225 and 315 degrees relative to the forward direction of the aircraft 130.

The antenna pattern of the transducers used in a typical radar warning receiver is Gaussian in both the azimuth and elevation directions. The attenuation of the antenna pattern as a function of off-boresight angle, theta, can be represented as:

$$\text{loss} = k * \text{theta}^2 \tag{1}$$

Attenuation loss is generally expressed in terms of decibels (dB) down from the peak amplitude of the antenna pattern. The "k" in Equation 1 typically has a value on the order of 0.0015 to 0.0025 dB/degree². The value of k varies with the frequency of the received signal.

Figure 2:
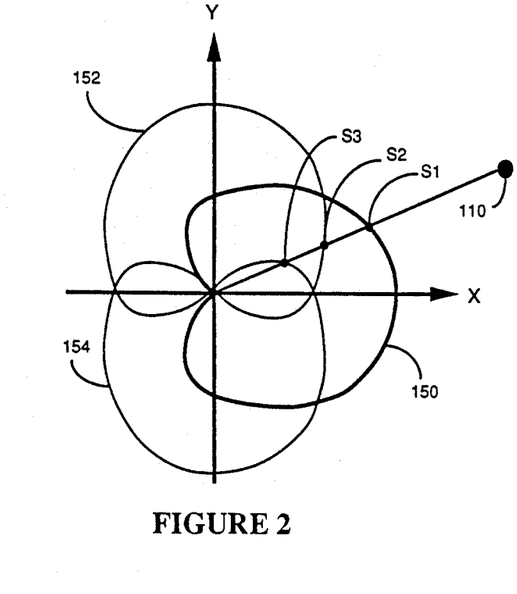
FIG. 2 schematically represents the superimposed signal strength patterns of three radar transducers.

FIG. 2 schematically represents the overlapping antenna patterns of three of the four transducers 120-126.

Figure 3:
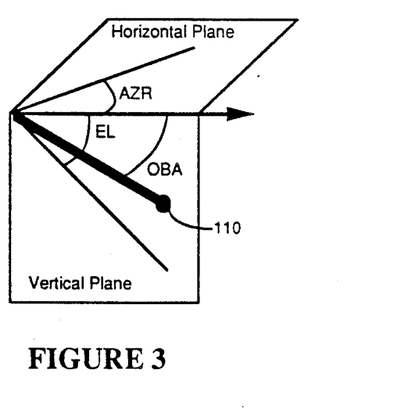
FIG. 3 schematically represents the angular measurements performed by the invention.

Referring to FIG. 3, AZR is the azimuth angle from the antenna to a radar emitting object 110, and EL is the elevation angle, measured from the plane of the four antennas 120-126 (i.e., the horizontal plane in FIG. 3) to the object 110. The off-boresight angle OBA for each antenna, (i.e., the angle between each antenna and the object, is a function of both the azimuth and elevation angles AZR and EL to the object 110. The relationship of the off-boresight angle, OBA, to the azimuth and elevation angles is:

$$\cos(OBA) = \cos(AZR)*\cos(EL) \qquad (2)$$

and thus:

$$OBA = \arccos(\cos(AZR)*\cos(EL)) \qquad (3)$$

For a given object location, the azimuth angle $AZ_n$ of the object with respect to each of the transducers can be represented as:

$$AZ_n = n - AZR, \text{ where } n = \{45, 135, 225, 315\} \qquad (4)$$

Using this notation, the set of off-boresight angles $OBA_n$ for an object with respect to the four transducers can be represented as:

$$OBA_n = \arccos(\cos(n-AZR)*\cos(EL)) \qquad (5)$$

and the signal attenuation $LOSS_n$ at each antenna is therefore $$LOSS_n = k*(\arccos(\cos(n-AZR)*\cos(EL))^2 \qquad (6)$$

Referring to FIG. 2, the antenna producing the largest signal from the object will be the antenna such that $AZ_n$ in equation 4 has a magnitude less than or equal to 45 degrees. The antenna producing the second largest signal will be adjacent to the one producing the largest signal. The antenna producing the third largest signal will be the one opposite the one producing the second largest signal.

If the object 110 is positioned directly ahead or behind the aircraft 130, or perpendicular to the aircraft's heading, causing two antennae to have equal strength signals, either of the remaining two antennae can be selected as the third antenna for the purposes of the following analysis.

FIG. 2 schematically represents the antenna patterns 150, 152 and 154 of the three antenna with the strongest signals. The relative signal strengths of the signals received by these antennae are represented as S1, S2 and S3. While FIG. 2 shows the antenna patterns in only one plane, each pattern is three dimensional. Thus, as will be clear to those who consider the matter, the relative strengths of the signals from the three antennae will change as the angle of elevation of the object is changed, because the object's emissions will be intersecting a different portion of each antenna pattern. For instance, two object locations with the exact same azimuth angle but different angles of elevation will produce different relative signals strengths. It is for this reason that the use of only two antennae signals is not adequate to make an accurate measurement of the azimuth angle of an object.

However, the inventors have found that the elevation angle EL and the azimuth angle of an object AZ can be uniquely and accurately computed as a function of two differential signals:

D1 = Largest Signal − Second Largest Signal

D2 = Second Largest Signal − Third Largest Signal (7)

where the values of D1 and D2 are represented in decibel units. In other words, the elevation and azimuth angles can be accurately computed as a function of the D1 and D2 values, as defined in Equation 7.

The way this is done is as follows. Using Equation 6, one first builds a large look-up table of the D1 and D2 values for every possible combination of azimuth and elevation angles. For example, in the preferred embodiment, the D1 and D2 values were computed using Equation 6 for all possible azimuth angles between 0 and 45 degrees, in one degree increments, and all possible elevation angles between 0 and 90 degrees, in one degree increments. More specifically, for every such pair of azimuth and elevation angles, the loss values for all four antennae were computed using Equation 6, the three largest values selected, and then D1 and D2 were computed.

The result of these computations is a large set of records, where each record contains an azimuth angle, an elevation angle, and D1 and D2 values. These records are then sorted by their D1 and D2 values. Finally, given any pair of D1 and D2 measurement values, all one needs to do to compute the corresponding azimuth and elevation angles is to find the closest set of D1 and D2 values in the table, and then read the corresponding azimuth and elevation values.

Figure 4:
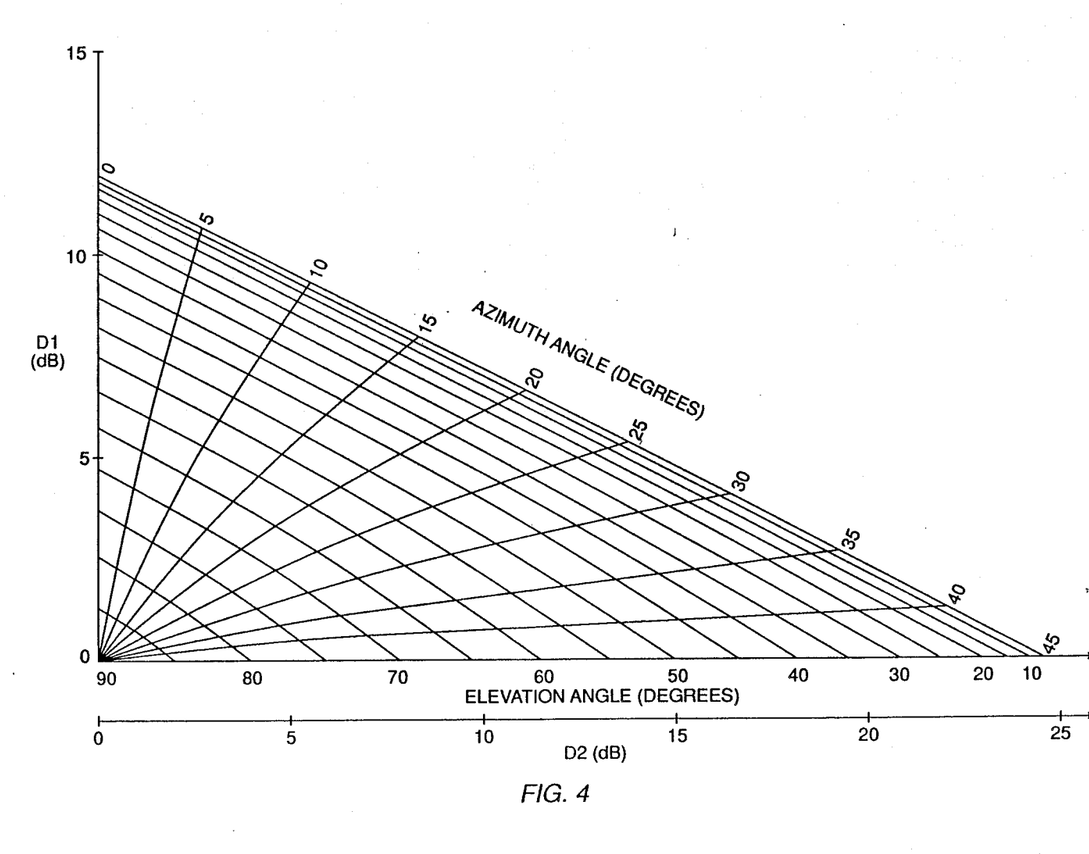
FIG. 4 graphically represents the data stored in a read only memory in the preferred embodiment, based on calculated transducer strength values.

FIG. 4 graphically represents the values of D1, D2, EL (elevation angle) and AZ (azimuth angle) computed using equation 6. D1 and D2 represent the two perpendicular axes of the graph. The downward sloping lines on the graphs represent isograms of elevation angle values and the upwardly sloping lines represent isograms of azimuth angle values.

Figure 5:
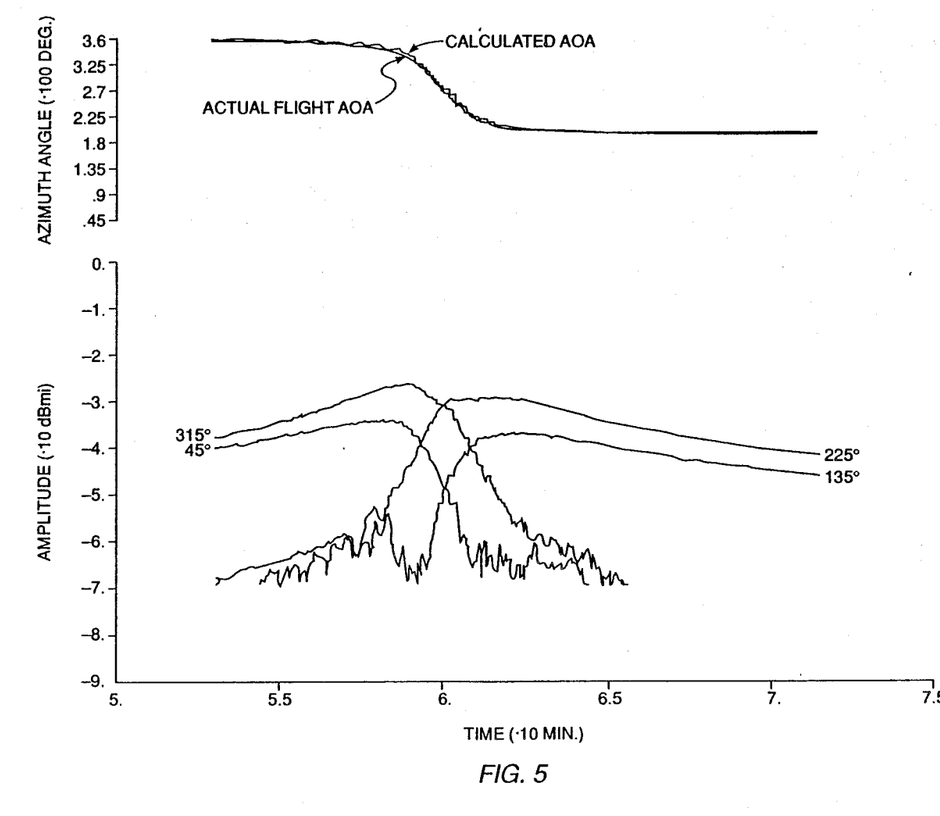
FIG. 5 depicts radar measurement data used to generate a table of azimuth and elevation angle values that is used in the preferred embodiment.

The inventors have found that FIG. 4, while mathematically accurate, does not account for the nonlinearities and individual differences of actual radar transducers. To generate an equivalent set of D1, D2, azimuth and elevation angle values based on measurements, the inventors flew an aircraft over a transmitter and recorded thousands of measurement records representing the actual angle of arrival (AOA) of the transmitter, and the actual transducer signal values generated by the four transducers on the aircraft during the flight. FIG. 5 represents the data recorded from one pass over (actually past) the transmitter. FIG. 5 also shows the AOA of the aircraft, calculated using the present invention, using the recorded transducer signal values.

Figure 6:
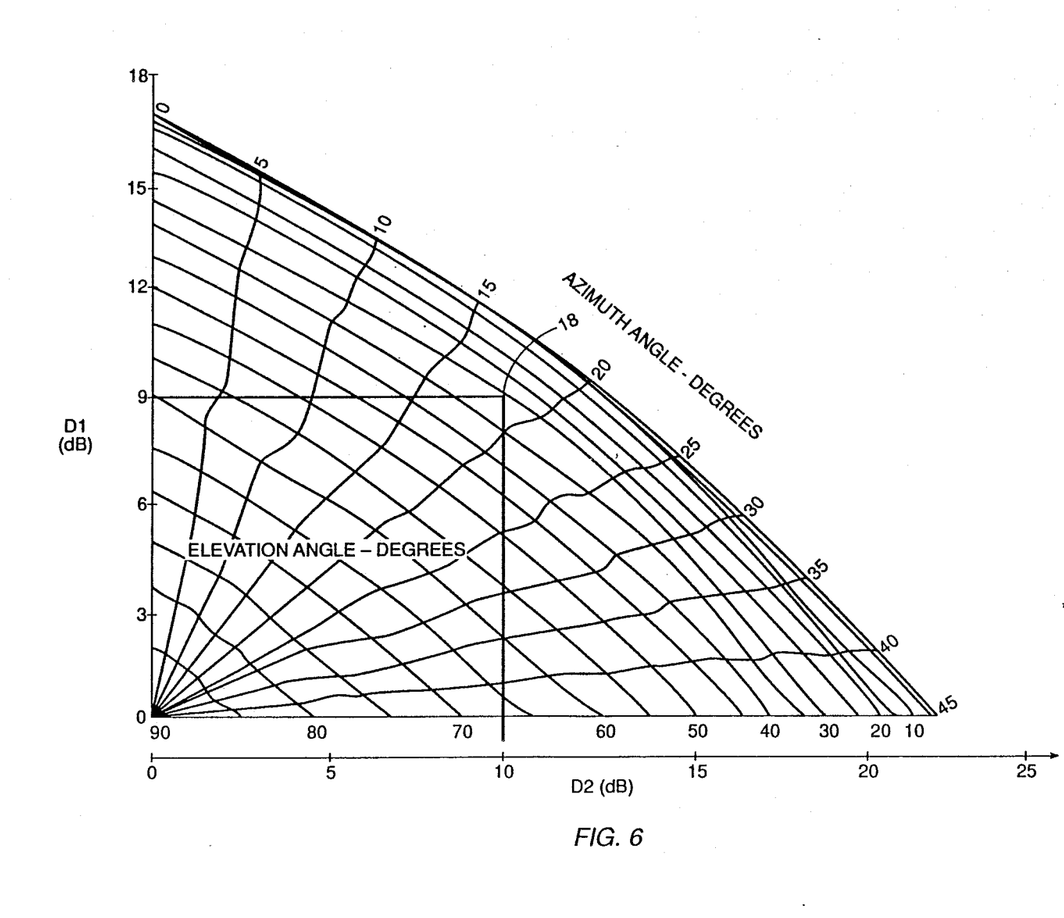
FIG. 6 graphically represents the data stored in a read only memory in the preferred embodiment, based on measured transducer strength values.

FIG. 6 graphically represents the values of D1, D2, EL (elevation angle) and AZ (azimuth angle) derived using actual measurement data obtained using the technique described with respect to FIG. 5. Comparing FIGS. 4 and 6, it can be seen that while the isograms in FIG. 6 are generally similar in shape to the isograms in FIG. 4, the specific locations (and thus D1 and D2 values) of the isograms in FIG. 6 vary considerably in some places from those in FIG. 4.

Figure 7:
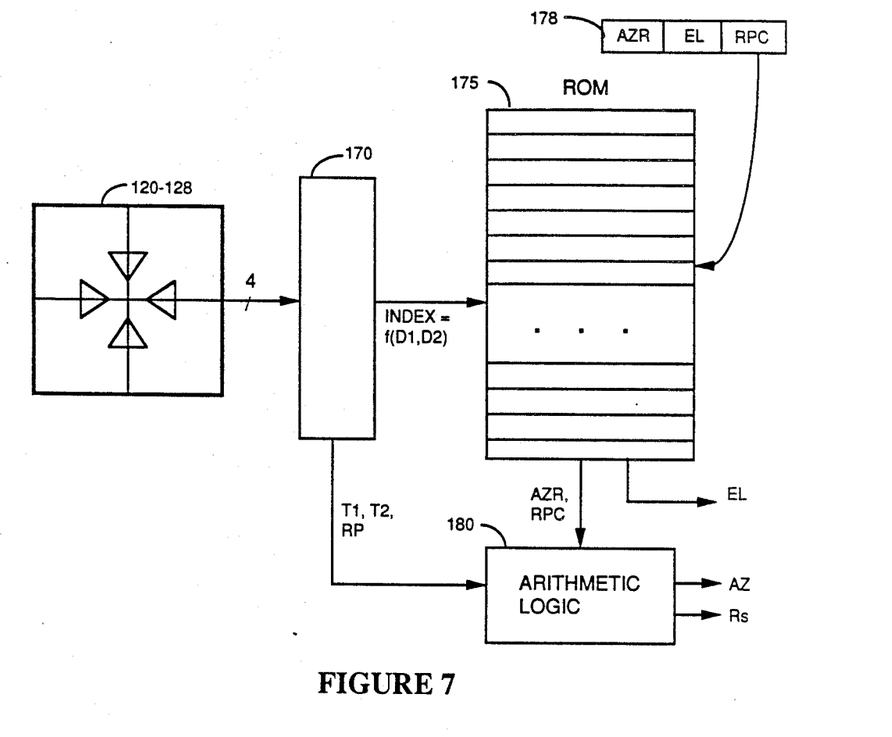
FIG. 7 is a block diagram of a radar system in accordance with the present invention.

Referring to FIG. 7, there is shown a block diagram of a system for computing the azimuth and elevation angles of an object using the signals from the three antennae with the strongest signals. The four analog signals from antennae 120-126 are received by a converter and selection circuit 170. The converter 170 converts each of the analog antenna signals into a digital value, and sorts the four values by their magnitudes. D1 and D2 are then computed as defined by Equation 7. In addition, the identities T1 and T2 of the antennae which received the first and second largest signals are denoted for later use.

A large read only memory (ROM) 175 is used to store a table of azimuth and elevation angle values (and also a signal measurement correction, as will be explained below). To define the table entries, all the measurement records of D1, D2, EL and AZR values are sorted by their D1 and D2 values. Then a set of EL and AZR values is generated for every possible pair of D1 and D2 values within a predefined range (such as 0 to 17 for D1 and 0 to 23 for D2), in 0.1 dB increments. In other words, the ROM 175 will contain one record 178 for every possible pair of D1 and D2 values, measured in 0.1 dB increments.

For this purpose, the measured D1 and D2 values are rounded off to the closest 0.1 dB to determine which measurement records should go in which slots of the ROM 175. Unfilled slots in the ROM are filed using interpolation, as will be understood by those skilled in the art.

To look up the azimuth and elevation angles for a given pair of D1 and D2 values, one first computes an index that is essentially a pointer to the corresponding record in the ROM 175. In the preferred embodiment, the index is computed as:

$$\text{Index} = 170*D2 + 10*D1 \quad (8)$$

More generally, the index will be a function of D1 and D2, the exact form of which will depend on the range of D1 and D2 values used and the spacing used between neighboring D1 and D2 values.

Each record 178 in the ROM stores three values: a "relative" azimuth angle value AZR, an elevation angle value EL, and a signal measurement correction value RPC. The purpose of the RPC value is explained below.

The azimuth value in the ROM is relative to direction of the transducer with the strongest signal. Depending on the location of the transducer with the second strongest signal, the relative azimuth value AZR will be added or subtracted from the azimuth angle of the first transducer.

When the antennae which receive the first and second largest signals are denoted T1 and T2, the actual azimuth angle is:

$$AZ = \text{azimuth}(T1) +/- AZR \quad (9)$$

where the sign in equation 9 is defined by the following table:

TABLE 1

| T1: | T2: 45 | 135 | 225 | 315 |
|---|---|---|---|---|
| 45 | NA | + | NA | − |
| 135 | − | NA | + | NA |
| 225 | NA | − | NA | + |
| 315 | + | NA | − | NA |

Two of the values in each row and column of Table 1 are "not applicable" (NA) because the second strongest signal is always received by a transducer next to the transducer which receives the strongest signal.

The arithmetic logic circuit 180 in FIG. 7 computes the value of the azimuth angle using the T1 and T2 values from circuit 170, and the AZR value from the ROM 175, in accordance with Equation 9. The arithmetic logic circuit 180 also may be used to compute the distance $R_s$ from the radar detection system to the radar emitting object 110, as will be explained in more detail below.

Figure 8:
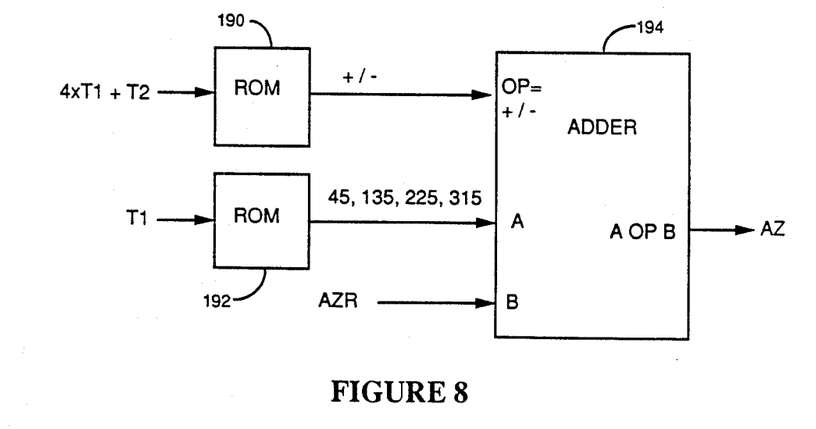
FIG. 8 is a block diagram of an arithmetic logic circuit.

FIG. 8 shows one preferred embodiment of the arithmetic logic circuit 180. This circuit uses two ROMs 190 and 192, and a standard adder 194. The first ROM 190 implements Table 1, shown above, so as determine whether adder 194 should add or subtract AZR from the azimuth of transducer T1. The second ROM 192 simply provides the azimuth of transducer T1 using the value of T1 as an index. As will be understood by those skilled in the art, ROM 190 could easily be replaced by a simple boolean logic circuit, and the ROM 192 is the equivalent of four digital registers with a selection circuit.

Figure 9:
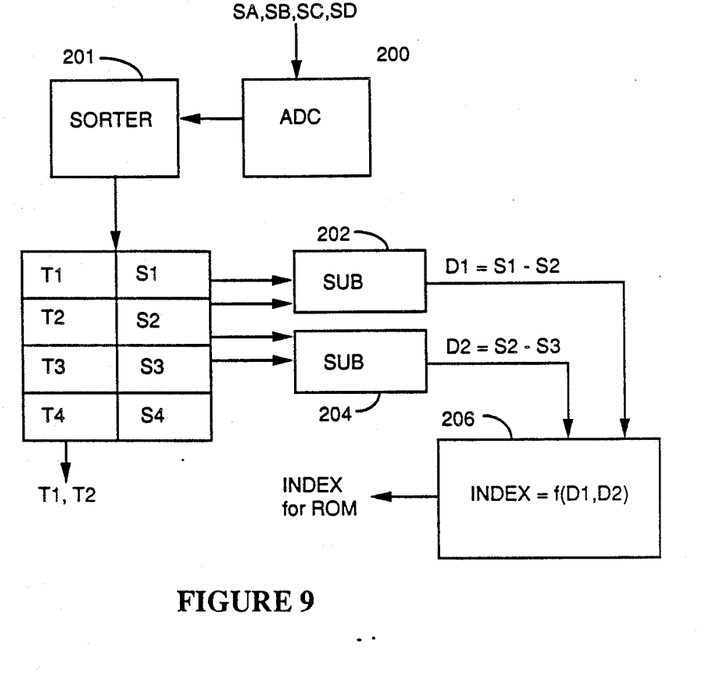
FIG. 9 is a block diagram of a data conversion and sorting circuit.

FIG. 9 is a block diagram of a preferred embodiment of the converter and selection circuit 170. A analog to digital converter 200 receives the four analog transducer values SA, SB, SC and SD and digitizes them. Then a sorter 201 generates a sorted table of signal values S1-S4. The sorter 200 also generates the identities T1 and T2 of the antennae which received the first and second largest signals.

Two subtractors 202 and 204 subtract S2 from S1 to generate D1, and subtract S3 from S2 to generate D2. Finally, an index computation unit 206 uses the D1 and D2 values from the subtractors 202 and 204 to generate an index value for reading the proper record in the ROM 175. Since the output of the index generator 206 is used to directly address the ROM 175, the index generator 206 can be said to perform table look ups.

The preferred embodiment of the invention is designed for extremely fast computation. Using high speed bipolar circuitry, the entire computation process can be performed in approximately 100 nanoseconds.

It should be noted that in other embodiments of the invention, the ROM 175 could store additional values, such as the angle of arrival, computed from the azimuth and elevation angles using Equation 3.

As noted above, a third value called the signal measurement correction value RPC is also stored in each record of the ROM 175. This value corresponds to the attenuation superimposed on the received radar signal by the antenna patterns. The attenuation is a function of the off-bore sight angle and is used to correct the measured signal strength of the radar. This, in turn, enables a more accurate calculation of distance to the radar emitting object, which is computed using the formula:

$$R_s = 10 \left[ \frac{RP + RPC - ERP + 38.6 + 20(\text{Log}_{10} RF)}{-20} \right] \quad \text{(Eq. 10)}$$

where $R_s$ is the range (i.e., distance) in nautical miles from the radar to the radar detection system. RP is the actual signal strength present (i.e., measured) at the radar detection system in decibel "dBm" units. RPC is the measurement correction factor stored in the ROM 175 in the record corresponding to the D1 and D2 values. RPC typically varies between 0 and 6.0 dBm, which means that the signal measurement correction may change the computed range $R_s$ by as much as a factor of two.

ERP in Equation 10 is the effective radiated power of the radar emitter, which is generally a predefined value that depends on the nature of the radar emitter. Finally, RF in Equation 10 is the radio frequency of the emitter measured in Megahertz units.

Thus, to enable more accurate distance-to-object calculations, all that needs to be stored in the ROM 175 is a signal measurement correction value RPC, as defined above, for each pair of D1 and D2 values. To compute the value $R_s$ quickly, the arithmetic unit 180 in FIG. 7 will typically need to be a programmed floating point computation circuit, many of which are commercially available, although a general purpose computer could also be used.

While the prior art systems use the measured signal strength to compute an estimate of the distance of the object, the present invention provides a signal measurement correction based on the actual angle of arrival, making it possible to generate a much more accurate distance to object value.

In other embodiments of the invention, where speed is not critical, a somewhat larger table of values can be stored in a ROM or an equivalent computer file. The records in this expanded ROM or file will include the corresponding D1 and D2 values. The technique for generating elevation and azimuth angles is then to find the record with the pair of D1 and D2 values closest to the actual D1 and D2 measurements. The elevation and azimuth values can then be taken directly from that record. Alternately, even more accurate angle values can be obtained by extrapolating from the values in two or three records in the table.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For instance, the techniques of the present invention can be used in stationary, land-based direction finders.

What is claimed is:

1. A radar detection system, comprising:
   a set of four transducer means for receiving signals indicative of the location of an object;
   sorting means coupled to said set of transducer means for selecting the first, second and third strongest of said received signals and for generating therefrom first and second differential signals, said first differential signal corresponding to the difference between the strongest and second strongest of said received signals and said second differential signal corresponding to the difference between the second strongest and third strongest of said received signals;
   table means for storing at least one angular value corresponding to each of a predefined set of pairs of said two differential signals; and
   lookup means coupled to said sorting means and said table means for retrieving from said table means an angular value corresponding to the differential signal values generated by said sorting means.

2. The system of claim 1 wherein
   said table means includes means for storing a signal measurement correction value corresponding to each of said predefined set of pairs of said two differential signals;
   said lookup includes means for retrieving from said table means a signal measurement correction value corresponding to the differential signal values generated by said sorting means; and
   said system further includes distance calculation means, coupled to said lookup means and said set of transducer means, for generating a distance value using a predefined function of said strongest signal received by said set of transducer means and said retrieved signal measurement correction value.

3. The system of claim 1 including
   angle calculation means coupled to said sorting means and said lookup means for adding said retrieved angular value to a predefined reference angle corresponding to the one of said transducer means which received said strongest signal.

4. A radar detection system, comprising:
   a multiplicity of transducer means for receiving radar signals indicative of the location of an object;
   sorting means coupled to said set of transducer means for selecting the first, second and third strongest of said received signals and for generating therefrom first and second differential signals, said first differential signal corresponding to the difference between the strongest and second strongest of said received signals and said second differential signal corresponding to the difference between the second strongest and third strongest of said received signals;
   table means for storing a signal measurement correction value corresponding to each of said predefined set of pairs of said two differential signals;
   lookup means coupled to said sorting means and said table means for retrieving from said table means a signal measurement correction value corresponding to the differential signal values generated by said sorting means; and
   distance calculation means, coupled to said lookup means and said set of transducer means, for generating a distance value using a predefined function of said strongest signal received by said set of transducer means and said retrieved signal measurement correction value.

5. The system of claim 4 wherein
   said table means includes means for storing at least one angular value corresponding to each of said predefined set of pairs of said two differential signals;
   said lookup includes means for retrieving from said table means an angular value corresponding to the differential signal values generated by said sorting means; and
   said system further includes angle calculation means coupled to said sorting means and said lookup means for adding said retrieved angular value to a predefined reference angle corresponding to the one of said transducer means which received said strongest signal.

6. A method of processing received radar signals in a radar detection system having a set of four radar signal transducers, the steps of the method comprising:
   selecting the first, second and third strongest of the signals received by said four transducers and generating therefrom first and second differential signals, said first differential signal corresponding to the difference between the strongest and second strongest of said received signals and said second differential signal corresponding to the difference between the second strongest and third strongest of said received signals;

providing a table of angular values, with at least one angular value corresponding to each of a predefined set of pairs of said two differential signals; and retrieving from said table an angular value corresponding to the values of said first and second differential signals.

7. The method of claim 6, further including the step of adding said retrieved angular value to a predefined reference angle corresponding to the one of said transducers which received said strongest signal.

8. The method of claim 6, further including the steps of providing a table of signal measurement correction values corresponding to each of said predefined set of pairs of said two differential signals;

retrieving from said table of signal measurement correction values a signal measurement correction value corresponding to the differential signal values generated by said sorting means; and generating a distance value using a predefined function of said strongest signal received by said set of transducers and said retrieved signal measurement correction value.

* * * * *